Aug. 6, 1940.  D. DREISS  2,210,397

LARGE SURFACE FILTER FOR ALL FLUIDS

Filed Jan. 27, 1938

INVENTOR.
Daniel Dreiss
By Brown, Critchlow & Flick
his ATTORNEYS.

Patented Aug. 6, 1940

2,210,397

UNITED STATES PATENT OFFICE 2,210,397

LARGE SURFACE FILTER FOR ALL FLUIDS

Daniel Dreiss, Clichy, France

Application January 27, 1938, Serial No. 187,275
In France February 2, 1937

4 Claims. (Cl. 210—169)

In industry it is often necessary to use filters having a volume as reduced as possible, either because a small amount of space is available, or because it is desired to obtain a light portable apparatus. Now, in order that the efficiency of such a device should be satisfactory, and, also for limiting in certain cases the pressure per unit of filtering surface, it is necessary that the latter should be sufficiently large.

The present invention relates to a device answering to the preceding requirements (large surface under a minimum volume) presenting, moreover, the following advantages: continuous surface and elimination of all folding. This latter point is of capital importance when a filter is to be made of a fragile material such as paper, mainly paper impregnated beforehand or so made as not to require impregnating, the utilisation of which tends to become general, this paper being particularly brittle; the absence of folds entirely eliminating the dangerous deteriorations of the filter frequent in apparatus comprising foldings.

The filter is constituted by a continuous band closed on itself, in the same way as an endless belt, the two inner faces of which are brought into close proximity without touching each other; a kind of parallelipipedon is thus obtained, the two opposite sides of which are very long, the two others being two curves, and the two bases of which are open. This double ribbon is then arranged in the space where the filter is to be placed, either by winding it, or by curving it in a zigzag manner so as not to crush it into folds or allow the surfaces to touch each other. The winding can be effected either circularly, or according to an oval, or according to any other suitable shape.

This operation is effected in such a manner as to reserve a free space between the convolutions. Two spaces are thus obtained: one between the convolutions of the winding, the other within the band arranged as an endless belt. The edges of th band will then be closed in a suitable manner; for instance, the lower part of the first space, and the upper part of the second space.

Consequently, a fluid in motion penetrating between the convolutions, must pass through the walls of the band in order to enter between its inner surfaces and to escape through the upper orifice.

The accompanying drawing, given by way of non-limiting example shows an embodiment of the subject-matter of the invention, the mechanism of which will be clearly understood. It relates to a filter for arsines made of paper or of asbestos or of any composition in which the endless band has been wound in a spiral.

Figure 1:
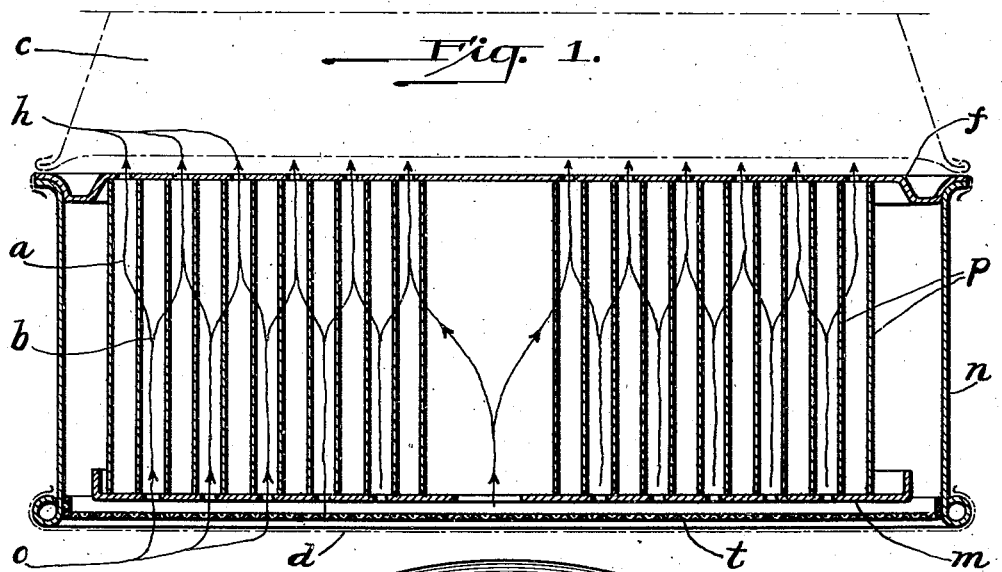
Fig. 1 is a sectional view of the filter secured to a cartridge containing active carbon C.
Figure 2:
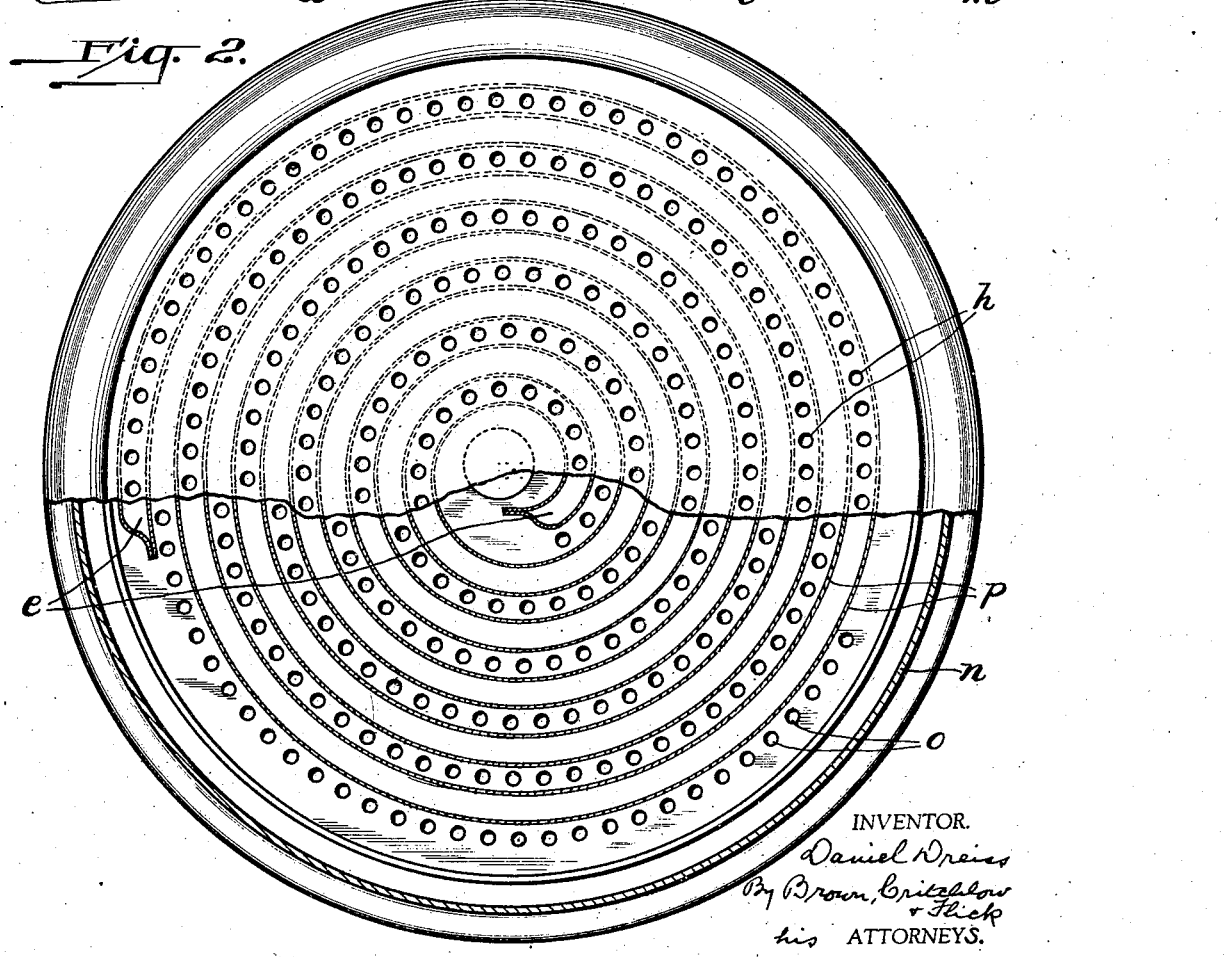
Fig. 2 illustrates the filter seen from above, the upper part being cut away to allow the base to be seen.

$p$ indicates the faces of the filtering material;

$a$ is the interval between the convolutions of the inner surface of the band;

$b$ is the interval between the convolutions formed by the outer surface of the band;

$o$ indicates holes opening between the outer surfaces and a few of which only have been shown for greater clearness;

$h$ indicates outlet orifices between the inner surfaces of the band;

$f$ is the upper plate and the cup-shaped form of which is devised for receiving a cement or lute in which the edges of the wound band are plunged in the hot state whilst reserving the holes $h$ by means of a suitable device;

$m$ indicates the lower plate on which the filtering band is secured in the same manner as on plate $f$;

$n$ is the outer casing which protects and holds the filter and which is connected by beading to the cartridge;

$t$ shows a protecting grate or grid;

$e$ indicates the two ends of the endless band;

The fluid to be filtered, in the present case foul air, enters through the lower holes $o$, passes through the filtering wall $p$ and escapes through the upper holes $h$ freed from solid or liquid particles.

This device finds its use for retaining the arsines in the cartridges of gas masks; it will be remembered that it is particularly advantageous for cakes made of paper impregnated beforehand or not requiring impregnating, which very badly supports being folded.

The manufacture is simple: the filtering surface is wound on two bands of flexible material having the thickness of the interval to be left between the surfaces: one in the interval $a$, the other in the interval $b$. A kind of cylinder is thus obtained the base of which is plunged in the cup filled with the lute or melted cement. In order that the latter should not escape through the holes, said holes are obturated by conical pegs or pins, supported by a foundation plate; these pegs or pins also serving as a guide for exactly placing the spiral. The lute having cooled, the bands of flexible material are first of all removed, the lower edge of which did not extend to the bottom of the spiral, then the foundation plate is removed and the holes are thus freed.

The same method of procedure is resorted to for placing the cup $f$ in position on the other base, except that use is not made of the bands of flexible material which have become useless. It is of course to be understood that the holes can be replaced by slots or even by a single slot. The cake thus formed is retained by beading under the upper part of the cartridge containing the carbon $c$. The cylinder $n$ surrounds the cake and protects it against shocks.

It is to be noted that the column of air to be filtered is directly presented on the entire surface of $m$, passes through the filter without distortion and enters the part $c$ through the entire surface of the base; thus all the carbon which is to retain the gases is used, no recess escapes from the sweeping action rendered even more effective by the conical shape of the cartridge.

The same advantages are obtained whatever may be the shape according to which the band is wound.

The invention also includes filters of the type described manufactured by moulding the filtering material for obtaining either the spiral or any other winding alone, or the moulding of the whole: filtering material and cups.

The applicant has obtained satisfactory results by using as filtering material either paper or asbestos or a mixture of both. He has also used as new filtering materials, spongy or microporous rubber flexible or hardened and porous metal. The use of these latter bodies allows of obtaining a more rugged filter which does not become damaged even under violent shocks.

What I claim as my invention and desire to secure by Letters Patent is:

1. A filter comprising a pair of filter sheets disposed face to face in spaced relation with their ends connected together, said sheets being wound into a coil to form a pair of independent channels, and means for closing the bottom of one channel and the top of the other, whereby a fluid entering the open bottom of the latter channel filters through said sheets and emerges from the open top of the other channel.

2. A filter comprising a pair of filter sheets disposed face to face in spaced relation with their ends connected together, said sheets being wound into a coil to form a pair of independent channels, plates disposed against the opposite edges of said sheets, and means for sealing said edges to the plates, one of the plates being provided with openings communicating with one of said channels, and the other plate being provided with openings communicating with the other of the channels.

3. The method of making a spiral filter comprising placing a pair of filter sheets and a pair of flexible strips in face to face engagement in alternating relation, winding the assembly into a coil, securing the edges at one side of the filter sheets in fixed spaced relation, removing said flexible strips, and securing the edges at the opposite side of the filter sheets in fixed spaced relation.

4. The method of making a spiral filter comprising placing a pair of filter sheets and a pair of flexible strips in face to face engagement in alternating relation, winding the assembly into a coil, cementing the edges at one side of the filter sheets to a perforated plate, removing said flexible strips, and cementing the edges at the opposite side of the filter sheets to another perforated plate.

DREISS, DANIEL.